US 6,705,033 B1

(12) United States Patent
Greene et al.

(10) Patent No.: US 6,705,033 B1
(45) Date of Patent: Mar. 16, 2004

(54) LED-ILLUMINATED OUTDOOR SIGN

(76) Inventors: Kenneth L. Greene, 7200 New Horizons Blvd., Amityville, NY (US) 11701; Jason Greene, 7200 New Horizons Blvd., Amityville, NY (US) 11701

( * ) Notice: Subject to any disclaimer, the term of this patent is extended or adjusted under 35 U.S.C. 154(b) by 51 days.

(21) Appl. No.: 10/144,307

(22) Filed: May 13, 2002

(51) Int. Cl.[7] .............................................. G09F 13/18
(52) U.S. Cl. ............................ 40/546; 40/578; 40/542
(58) Field of Search ......................... 40/542, 544, 546, 40/547, 578; 362/31

(56) References Cited

U.S. PATENT DOCUMENTS 3,578,538 A * 5/1971 Prosser et al. ............. 40/544 X
3,591,942 A * 7/1971 Van Swearingen ........... 40/615
4,811,507 A * 3/1989 Blanchet ........................ 40/546
5,992,068 A * 11/1999 de Saro ..................... 40/615 X

FOREIGN PATENT DOCUMENTS

GB          1 091 516     * 11/1967 ................. 40/546

* cited by examiner

Primary Examiner—Joanne Silbermann
(74) Attorney, Agent, or Firm—Myron Amer P.C.

(57) ABSTRACT

A street sign sealed against weather elements during outdoor use consisting of an assemblage of panels, one of which is of unnotched and inwardly notched word-forming letter two portions of width of its acrylic plastic construction material, and peripheral LEDs optically arranged to illuminate by impingement said letters of said notched width portion rendered visible through said unnotched width portion which serves as a weather seal for said illuminated display.

1 Claim, 3 Drawing Sheets

LED-ILLUMINATED OUTDOOR SIGN

The present invention relates generally to an improved street sign in which, more particularly, LEDs are the source of illumination of the sign and the noteworthy improvements, embodied in its construction is, in furtherance of its outdoor use, the weather barrier protection it A provides to the LEDs against short circuits and the like, without which outdoor use would not be possible.

EXAMPLE OF THE PRIOR ART

Advantageous use of light emitting diodes (LEDs) for sign illumination, a building "exit" sign being an example, is already known from U.S. Pat. No. 6,026,602 for "Apparatus and Method of Indirectly Illuminating A Sign" issued to Grondal et al. on Feb. 2, 2000. In the '602 patented sign the LEDs positioned about the periphery of the letters spelling out the sign name provide it with high visibility, but such a sign as known from common experience is positioned indoor to achieve egress outside for those instructed by the sign. In an outdoor sign, the LEDs are thought to be a drawback because exposure to weather elements would cause short circuits and other malfunctioning, and thus the high performance visibility afforded by LEDs is not used in a common, ordinary street sign which is relied on to provide traffic and like vital information to the public.

Broadly, it is an object of the present invention to overcome the foregoing and other shortcomings of the prior art.

More particularly, it is an object to display for external viewing through acrylic material LED-illuminated street names and thusly to use to advantage both utilitarian functions of the acrylic, namely, to reflect light and to seal against water penetration to the LEDs, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

Figures 1, 2:
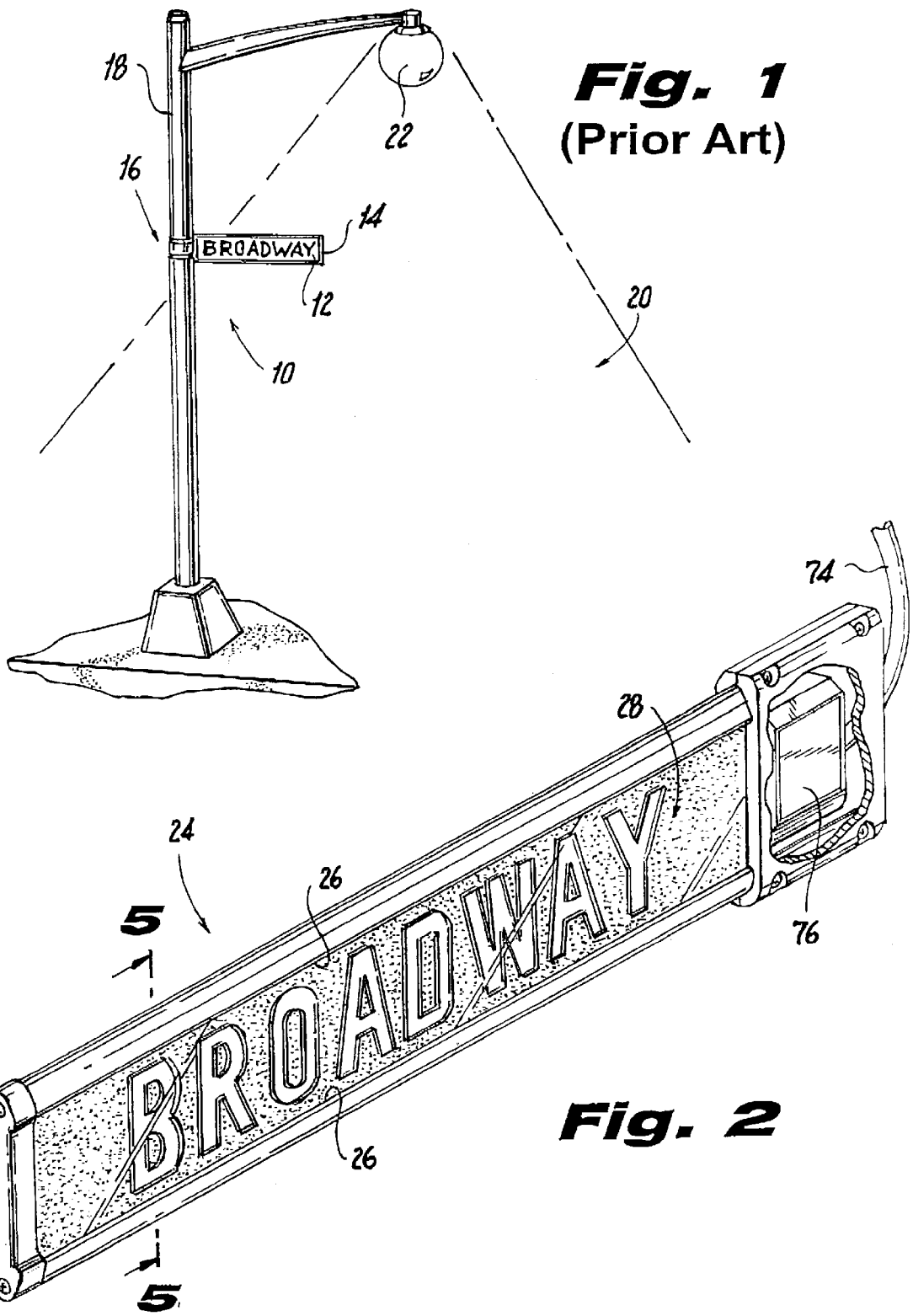
FIG. 1 is a perspective view of a prior art street sign.
FIG. 2 is a perspective view, on an enlarged scale, of a street sign constructed according to the present invention.
Figure 3:
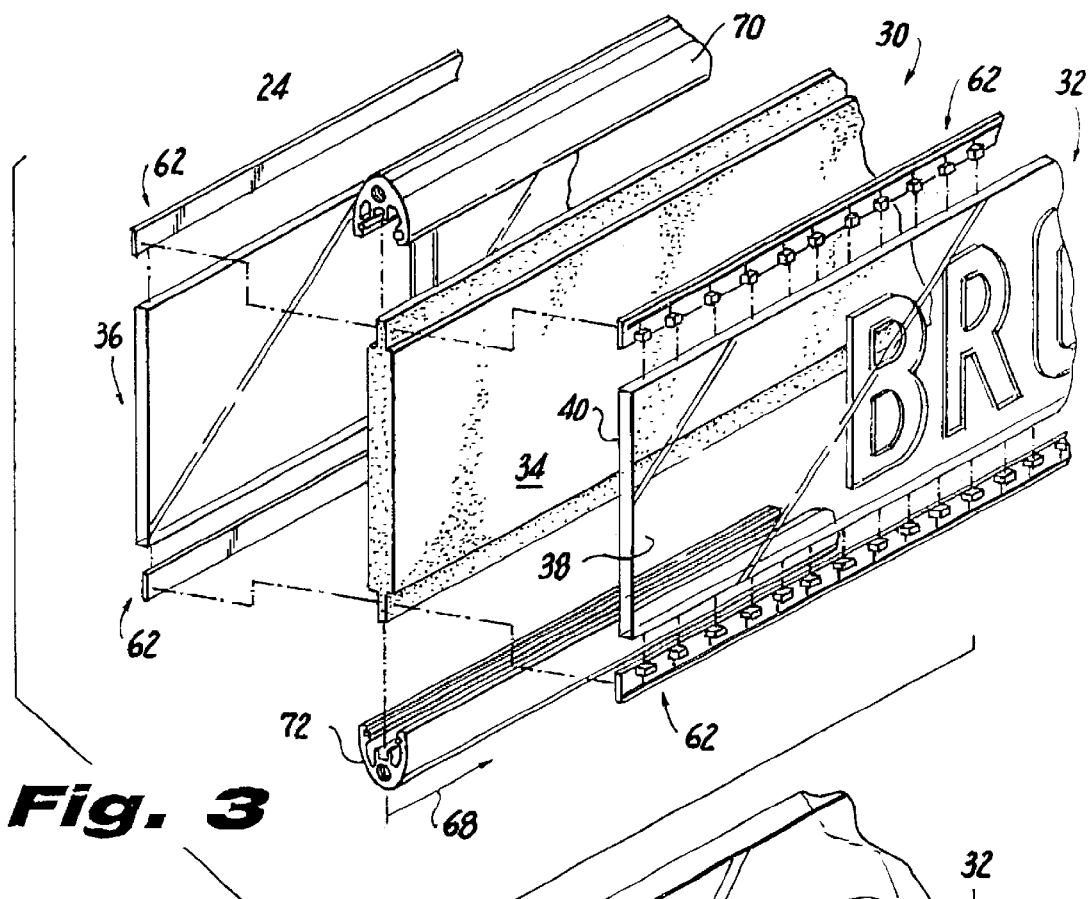
FIG. 3 is a partial exploded perspective view of the components of the street sign of FIG. 2.
Figure 4:
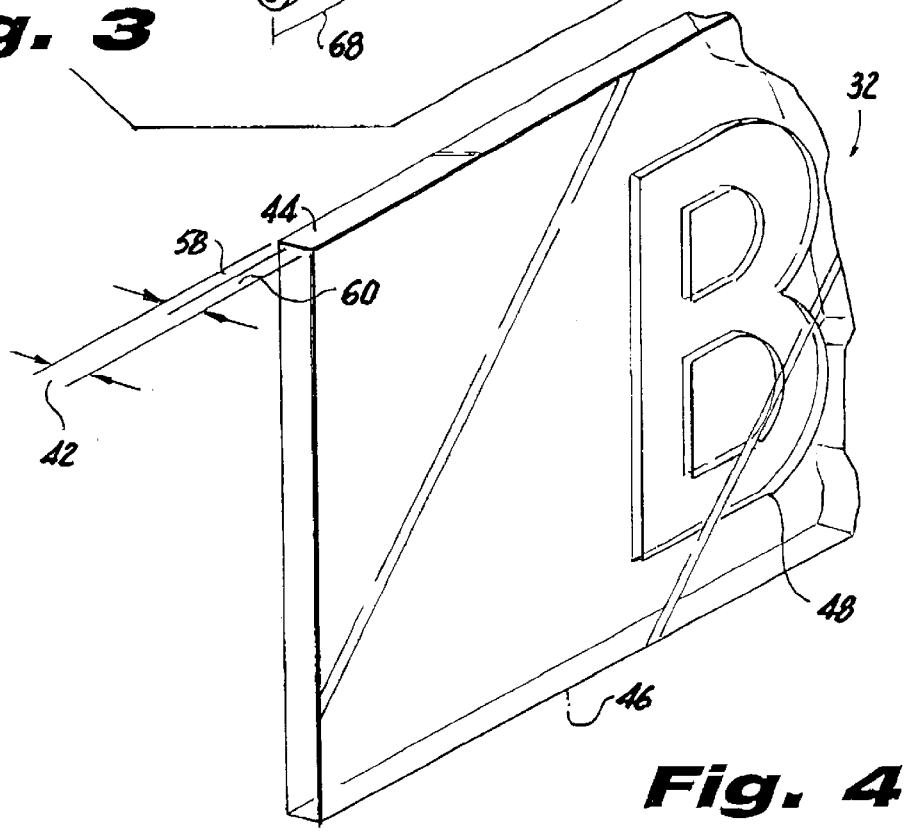
FIG. 4 is an isolated perspective view of the acrylic panel component of the FIG. 3 components.
Figure 5:
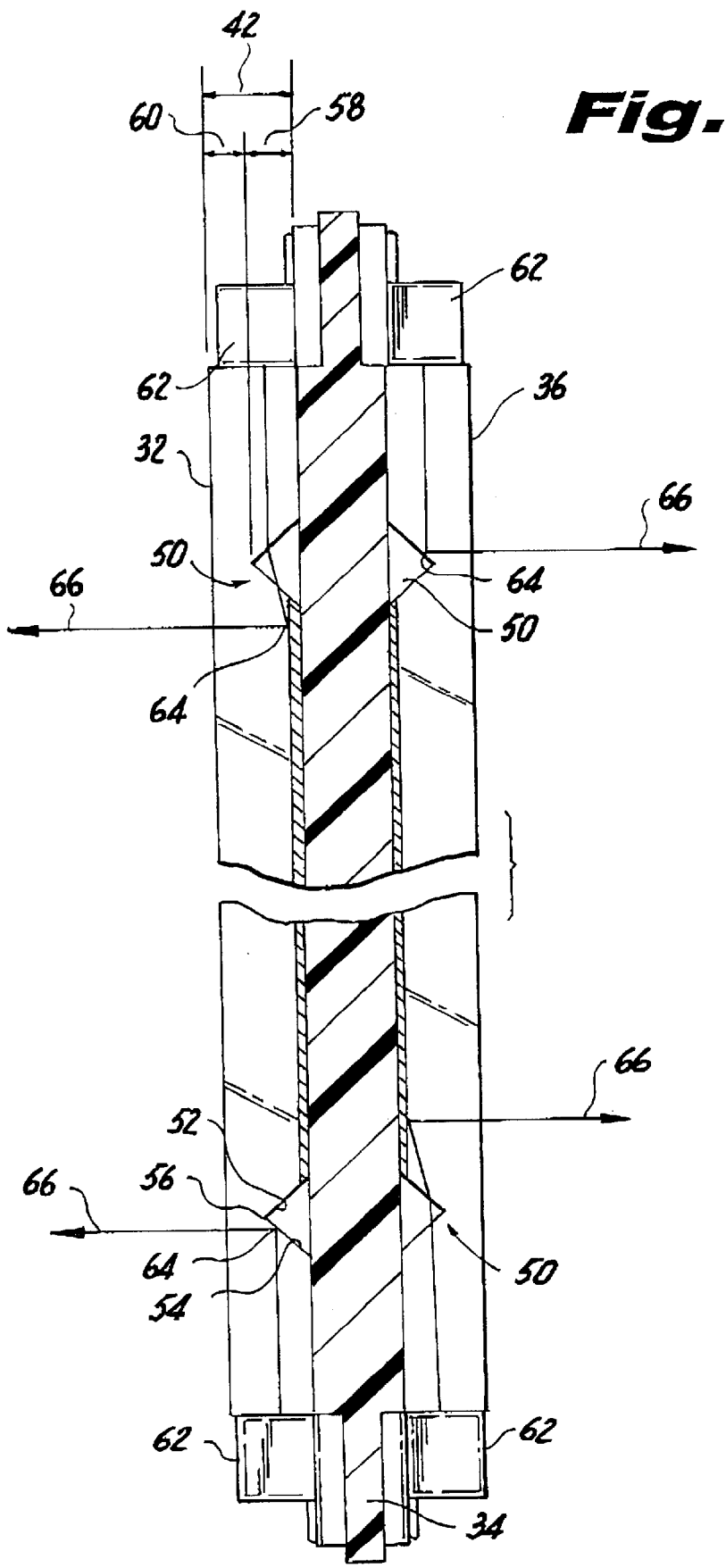
FIG. 5 is a side elevational view of the street sign, in section taken along line 5—5 of FIG. 2

The FIG. 1 prior art outdoor street sign, generally designated 10, is in popular use despite obvious drawbacks, because of its low cost simple construction consisting of the displayed street name 12 mounted in a sign frame 14 attached, as at 16, adjacent the top of a lamp pole 18, so as to be within the cast illumination 20 of the source of illumination or bulb 22 of the pole 18. For the lack of anything better, such as a source of illumination directly embodied in the sign construction and operating mode, rather than the indirect clearance-positioned light source 20, the FIG. 1 street sign is relied upon to provide location information by visual display even though of nominal effectiveness. Favoring this use of indirect lighting is also the inability, up to the within invention, to obviate the adverse consequences of deterioration of the sign, including short circuits and the like, as are caused by weather elements to which the sign is subjected to in its outdoor use.

Overcoming the foregoing and other shortcomings of the prior art, there is disclosed an improved outdoor street sign, generally designated 24, substituting for the indirect light source 20, sign-integrated Light Emitting Diodes or LED's as the source of illumination 26, which illuminates the street name 28 to such a significant extent that its visibility during field testing was approximately 500 feet in evening and night ambient light. Sign 24 provides high visibility performance and, it is to be noted, is effectively sealed against adverse consequences of weather, all as will be better understood as the description proceeds.

The LED-illuminated sign 24 is an assemblage 30 of select plural panels 32, 34 and 36 in adjacent face-to-face relation, in which one selected panel 34 is rectangular in shape and of opaque plastic construction material, and at least one, if a one-way observed sign, of the remaining two panels 32 and 36, are each similarly rectangular in shape and specifically are of acrylic plastic construction material, and occupy an exterior position in the assemblage 30 thereby using panel 32 as the described example, having panel 32 positioning a front surface 38 outwardly and in a display position from the sign 24 and an opposite rear surface 40 in an interior location adjacent the panel 34, the surfaces 38 and 40 delimiting therebetween a width 42 of which edge 44 and edge 46 respectively are the top and bottom of the sign and through which, as will be explained, LED-emitted illumination is transmitted into the body 42 of the panel 32.

The preparation of the panel 32 and, if used panel 36, for sign display service contemplates on each adhesively secured on the panel rear surface 40 word-forming spaced apart letters 48 spelling out the street name 28, in this case BROADWAY and of commercially available fluorescent chemical constituency, one acceptable source being 3M, 2100 Wilson Avenue, St. Paul, Minn. 55119. After being thusly prepared, the rear surface 40 is worked upon by a Computer Navigated Control Router or CNC Router metal-modifying device of known construction and operating mode.

More particularly, the CNR device is used to trace along the outline of the letters 48, thereby removing a select quantity of acrylic construction material which results in an inwardly facing V-notch 50, formed by angled sides 52 and 54 converging at a line intersection 56 which is at a partial depth 58 of the total width 42 of the panel 32, the remaining adjacent depth 60 being unnotched and intact.

The next significant preparation of the panel 32 is operatively disposing in an appropriate manner an electrically parallel-connected linear array of LED's, individually and collectively designated 62, optically arranged when battery or line current operated to emit illumination along a light path through the body or width 42 of the panel 32 such that the light transmitted along the light path impinges, as at sites of impingement, individually and collectively designated 64, against the notch sides 52, 54, causing refracted light paths, individually and collectively designated 66, some of which exit through the unnotched width 60 to illuminate to a viewer the outline of the letters 48, and some of which impinge on the letters 48 per se and after which exit through the unnotched depth 60, to illuminate to a viewer the shapes of the letters within the illuminated outline 52, 54.

From the description provided, it should be readily appreciated that the interposed position of the display sign components 52, 54, 48 between the opaque panel 34 and the panel width 58 effectively serves as a weather barrier seal during outdoor use of the sign 24.

Similarly sealing the LED's 62 against weather elements are metal extrusions cut to length 68 and disposed as sign frame members 70 and 72 over the LED's along the top and bottom edges 44 and 46.

For completeness sake it is noted that the sign 24 is powered either by battery or line current via conductors 74 and a voltage regulator 76. A one-way display sign 24, using only one of the panels 32, 36 is appropriate for a one-way traffic thoroughfare, a lawn sign post of a private dwelling, an entrance sign over a restaurant or the like, and other end uses.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A LED-illuminated outdoor sign comprising:
  A. an assemblage of selected plural panels in adjacent face-to-face relation;
  B. one selected first panel being rectangular in shape of opaque plastic construction material;
  C. at least one other second selected panel similarly rectangular in shape of clear acrylic construction material and in an exterior position in said assemblage;
  D. said second panel having an exterior front surface and interior opposite rear surface delimiting a selected width therebetween and having to the extent of said width a top edge and a bottom edge through which there is light transmission access into said panel;
  E. word-forming spaced apart letters of fluorescent chemical constituency disposed in a visual sign display in attached relation to said second panel rear surface;
  F. removed selected quantity of acrylic construction material from said second panel rear surface in locations in tracing relation about said letters so as to form edges bounding V-shaped notches oriented forwardly in said second panel;
  G. said selected quantity of said removed acrylic construction material forming said V-shaped notches being of an extent for only partially of said selected width of said second panel delimiting a first width rearwardly of said second panel front surface without said notches and a second width forwardly of said second panel rear surface having said notches;
  H. LED illumination-emitting means operatively disposed along said top and said bottom edges of said second panel effective to transmit illumination therefrom through said partial first width of said second panel and in a path resulting in sites of impingement upon said edges bounding said V-shaped notches and upon said fluorescent chemically constituted letters;
  I. said transmitted illumination impinging upon said edges in said rear surface of said second panel being released through said edges in said rear surface from said second panel; and
  H. said released transmitted illumination being visually detected through said second width of said second panel;

whereby a sign light display is illuminated and within a weather barrier during outdoor use of said sign.

* * * * *